United States Patent [19]

Spann, Jr.

[11] Patent Number: 4,778,126

[45] Date of Patent: Oct. 18, 1988

[54] WHEELED VEHICLE WINCH ASSEMBLY

[76] Inventor: C. D. Spann, Jr., 8637 Floyd, Overland Park, Kans. 66212

[21] Appl. No.: 816,853

[22] Filed: Jan. 7, 1986

[51] Int. Cl.[4] ........................ B65H 54/00; B66D 1/00; B62D 57/00

[52] U.S. Cl. ........................ 242/95; 254/325; 180/7.5

[58] Field of Search ........................ 242/95, 86.5 R; 254/323, 325, 389, 263, 280, 282; 180/7.5, 53.61

[56] References Cited

U.S. PATENT DOCUMENTS

| | | | |
|---|---|---|---|
| 1,262,543 | 4/1918 | Morrow et al. | 242/95 |
| 2,240,570 | 5/1941 | Oesterheld | 242/95 |
| 2,527,634 | 10/1950 | Groves | 242/95 |
| 3,099,416 | 7/1963 | Wright | 242/95 |
| 3,128,992 | 4/1964 | Luketa | 254/415 |
| 3,160,364 | 12/1964 | Bailey | 242/95 |
| 4,160,541 | 7/1979 | Harken et al. | 254/415 X |
| 4,568,036 | 2/1986 | Kearney | 242/95 |

*Primary Examiner*—David Werner

*Attorney, Agent, or Firm*—Walker & McKenzie

[57] ABSTRACT

A winch assembly for use with a wheeled vehicle. The assembly includes a first hub member fixedly attached to a drive wheel of the vehicle, a reel member fixedly attached to the first hub member, a cable having one end attached to the reel member and having another end fixedly attached relative to an anchor, a second hub member fixedly attached to a non-drive wheel of the vehicle, and a guide attached to the second hub member and guiding the cable between the reel member and the anchor.

7 Claims, 5 Drawing Sheets

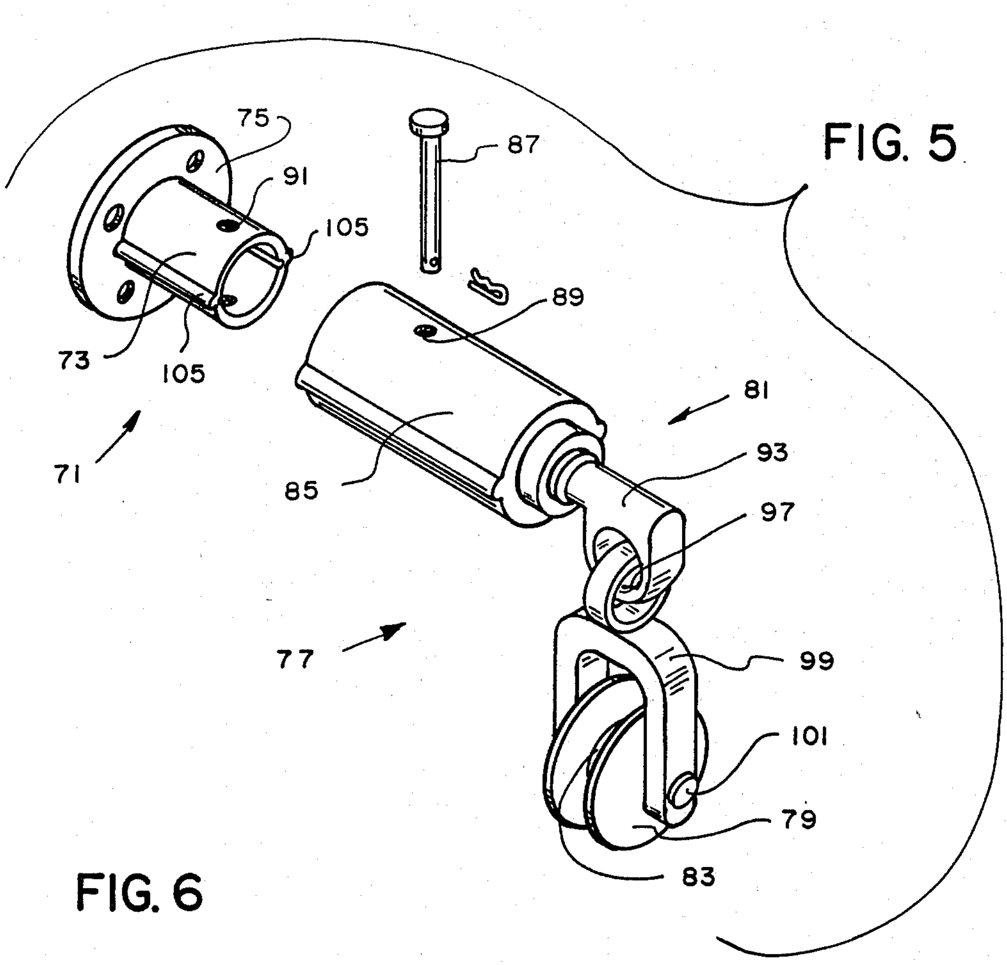
FIG. 5
FIG. 6
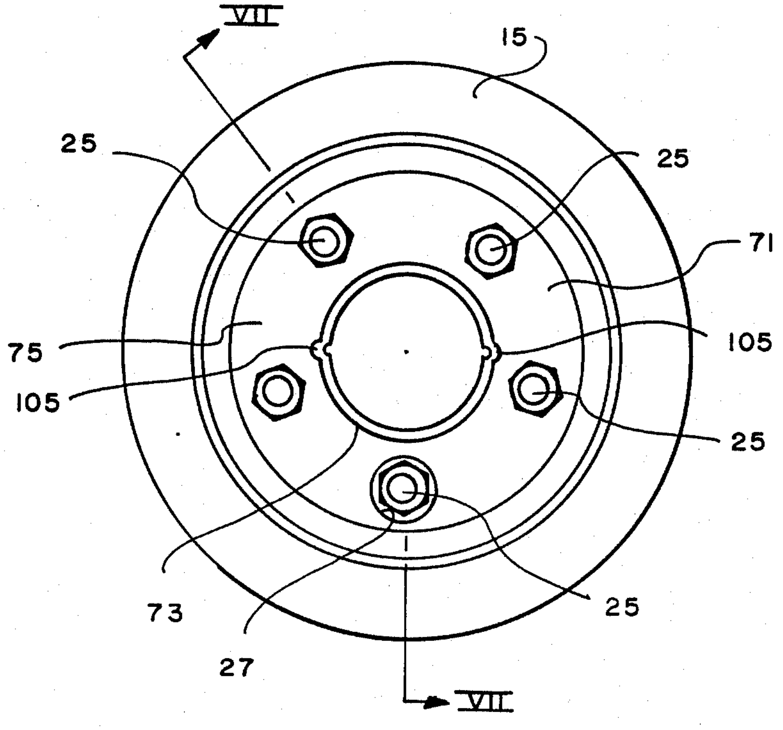

WHEELED VEHICLE WINCH ASSEMBLY

BACKGROUND OF THE INVENTION

1. Field of the Invention

The present invention relates, in general, to winch mechanisms and the like for use with a motor vehicle, such as an automobile or the like, to aid in pulling the vehicle from mud, snow or the like.

2. Description of the Prior Art

Heretofore, various winch mechanisms have been developed for use in pulling motor vehicles from mud, snow or the like. Such prior art winch mechanisms include electric motor driven winches, manually operated lever-type winches (often referred to as "come-a-longs"), and the like. Also, see, for example, Halvorson, U.S. Pat. No. 1,380,205; Smith, U.S. Pat. No. 2,662,731; Jack, U.S. Pat. No. 3,278,159; Blum, U.S. Pat. No. 3,784,164; Cooper, U.S. Pat. No. 4,135,681; and Gilbert, U.S. Pat. No. 4,291,847. None of the above prior art structures disclose or suggest the present invention.

SUMMARY OF THE INVENTION

The present invention is directed toward providing an improved winch assembly which can be easily attached to a drive wheel and a non-drive wheel of a vehicle to aid in pulling the vehicle from mud, snow or the like. The concept of the present invention is to fixedly attach a first hub member to the drive wheel of a vehicle for rotation therewith; fixedly attach a reel member to the first hub member for rotation therewith; fixedly attach a first end of an elongated cable to the reel member with the second end of the cable fixedly attached to an anchor member; fixedly attach a second hub member to a non-drive wheel of the vehicle; and attach a guide means to the second hub member for guiding a midportion of the cable between the wheel member and the anchor member.

BRIEF DESCRIPTION OF THE DRAWINGS

FIG. 5 is an exploded perspective view of a non-drive wheel assembly of the winch means of the present invention.

FIG. 6 is a side elevational view of a second hub member of the winch means shown attached to a non-drive wheel of an automobile.

DESCRIPTION OF THE PREFERRED EMBODIMENT

The winch assembly 11 of the present invention is for use with a wheeled vehicle, such as an automobile, truck or the like, having at least one drive wheel 13 and having another wheel located substantially in alignment with the drive wheel 13. This other wheel may be a non-drive wheel 15.

Figure 2:
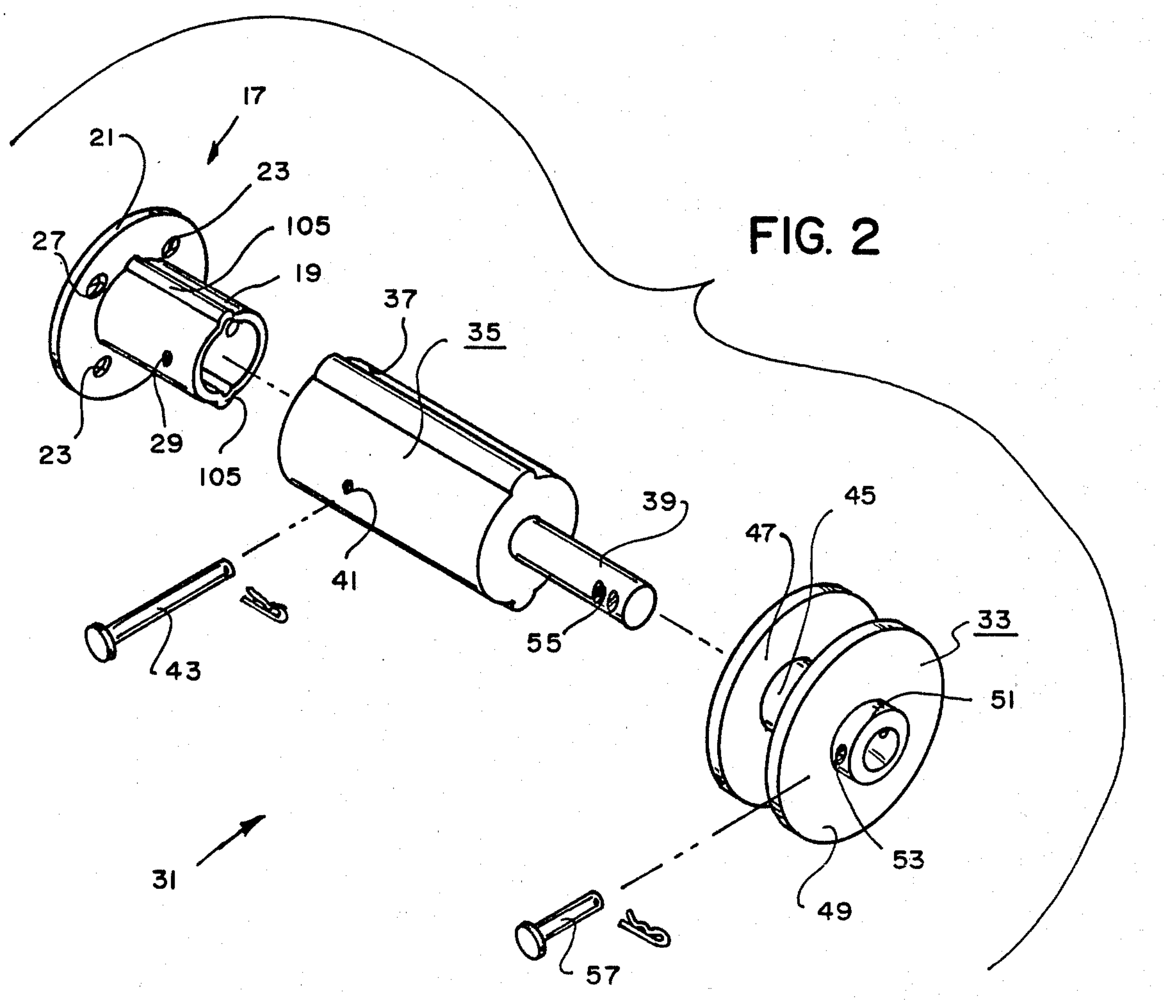
FIG. 2 is an exploded perspective view of a drive wheel assembly of the winch means of the present invention.
Figure 3:
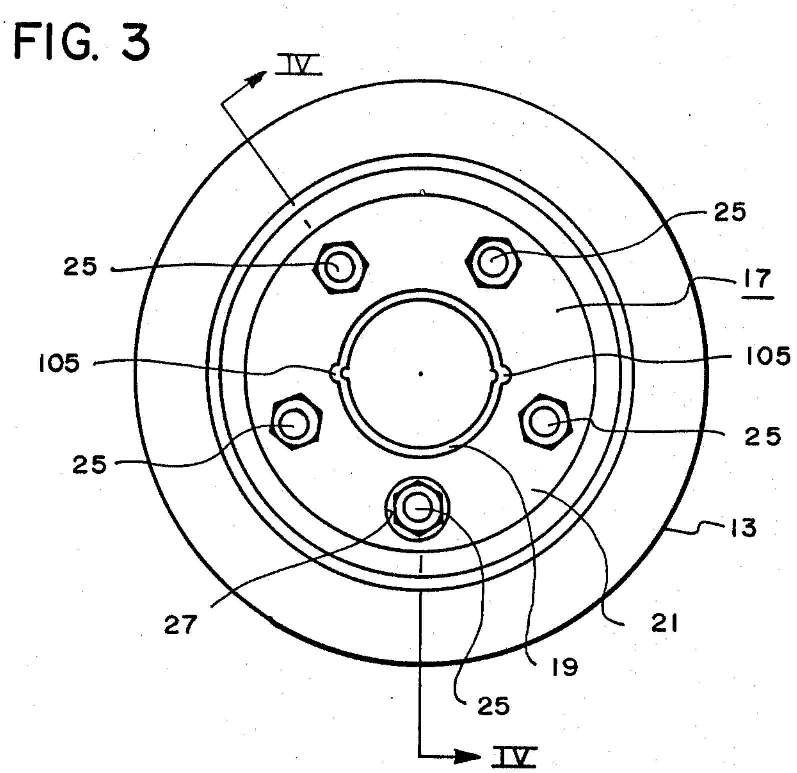
FIG. 3 is a side elevational view of a first hub member of the winch means shown attached to a drive wheel of an automobile.
Figure 4:
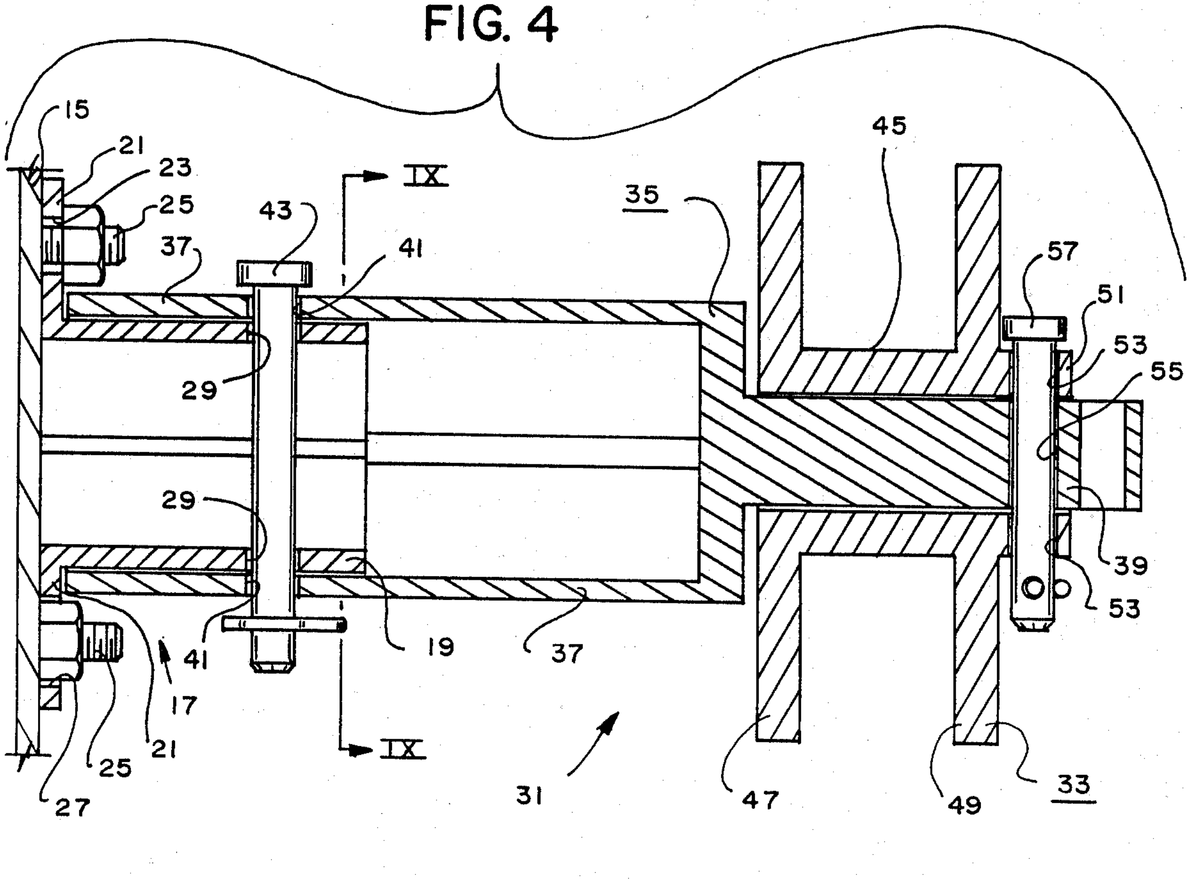
FIG. 4 is an enlarged sectional view substantially as taken on line IV—IV of FIG. 3 with portions of the drive wheel assembly added for clarity.
Figure 7:
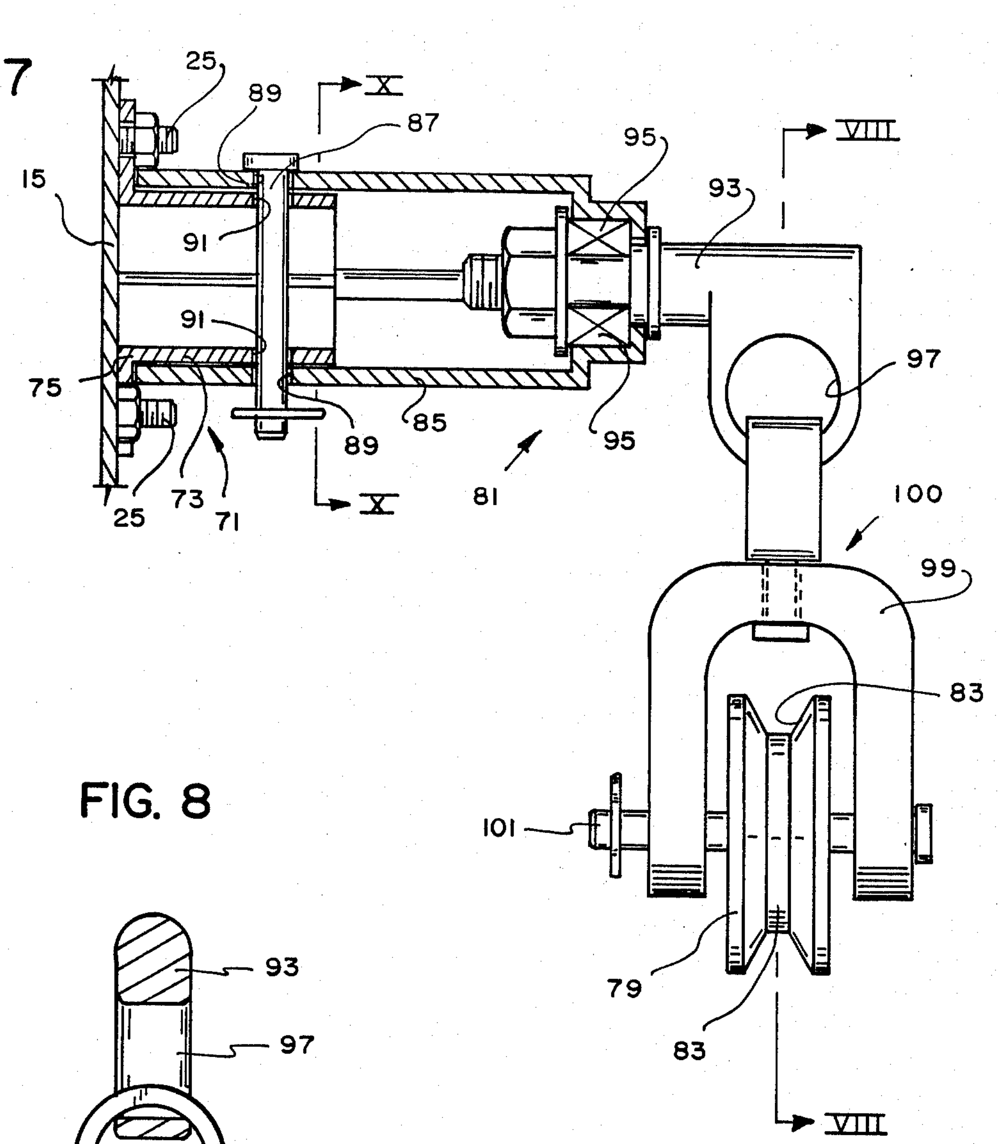
FIG. 7 is an enlarged sectional view substantially as taken on line VII—VII of FIG. 6 with portions of the non-drive wheel assembly added for clarity.

The assembly 11 includes a first hub member 17 (see, in general, FIG. 2) for being fixedly attached to the drive wheel 13 and for rotating therewith. The first hub member 17 preferably has a shaft 19 positioned to rotate along the axis of the drive wheel 13. The shaft 19 may be fixedly attached to the drive wheel 13 in any manner apparent to those skilled in the art. Thus, the shaft 19 may be integrally constructed with the typical rim of the drive wheel 13 in any manner now apparent to those skilled in the art. Alternately, the first hub member 17 may include a flange 21 with the shaft 19 and flange 21 being integrally constructed as a one-piece unit out of metal or the like and with a plurality of apertures 23 extending through the flange 21 for allowing the flange 21 and shaft 19 to be fixedly bolted to the drive wheel 13 by way of the typical lug bolts 25 of the drive wheel 13. The flange 21 may include one enlarged aperture 27 therethrough which will pass over the head of one lug bolt 25 to allow the first hub member 17 to be fixedly attached to the drive wheel 13 without causing the drive wheel 13 to be removed from the vehicle. That is, to attach the first hub member 17 to the drive wheel 13, all the lug bolts 25 but one are removed from the drive wheel 13. Next, the flange 21 is placed against the drive wheel 13 with the one remaining lug bolt 25 extending into the enlarged aperture 27. The other lug bolts 25 can then be passed through the apertures 23 and reattached to the wheel structure thereby securely attaching the first hub member 17 to the drive wheel 13 whereby rotation of the drive wheel 13 will result in rotation of the shaft 19 of the first hub member 17. A transverse aperture 29 is preferably provided through the shaft 19 for reasons which will hereinafter become apparent.

The assembly 11 includes a reel member 31 (see, in general, FIG. 2) for being fixedly attached to the first hub member 17 and for rotation therewith. The reel member 31 preferably includes a spool member 33 and a connecting member 35 for connecting the spool member 33 to the shaft 19 of the first hub member 17 for rotation therewith. The connecting member 35 may include a sleeve 37 for fitting over the shaft 19 and an axle 39 extending outward from the sleeve 37. Transverse apertures 41 may extend through the sleeve 37 for allowing the sleeve 37 to be fixedly attached to the shaft 19 by way of a pin member 43 adapted to extend through the transverse apertures 29, 41. The spool member 33 includes a hollow body 45 for fitting over the axle 39 of the connecting member 35 and a pair of flange members 47, 49. A portion of the hollow body 45 may extend outward of the flange member 49 for defining a collar 51. Transverse apertures 53 may extend through the collar 51. Transverse apertures 55 may also be provided through the axle 39 to allow the spool member 33 to be fixedly coupled to the connecting member 35 by way of a pin member 57 extending through the transverse apertures 53, 55.

The assembly 11 includes an elongated cable 59 (see FIG. 1) having a first end 51 for being fixedly attached to the spool member 33 and having a second end 63.

The cable 59 may be of any typical construction well-known to those skilled in the art to provide a flexible, strong structure. Thus, for example, the cable 59 may consist of an elongated length of typical wire rope or the like.

Figure 1:
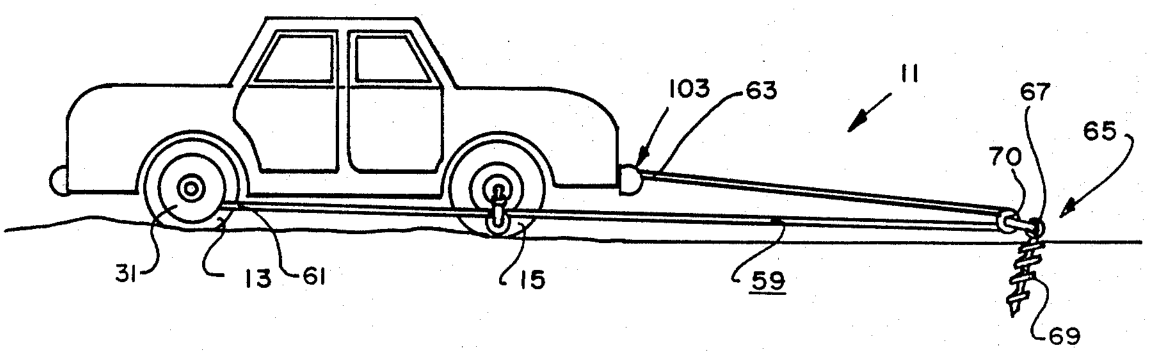
FIG. 1 is a side elevational view of the winch means of the present invention shown in combination with an automobile.

The assembly 11 is adapted to be used with an anchor member 65 (see FIG. 1). The anchor member 65 may consist of an existing tree, post or the like adjacent the location of the wheeled vehicle or may consist of a portable structure for being secured to the ground adjacent the wheeled vehicle. Thus, the anchor member 65 may consist of a post member 67 having a plurality of threads 69 thereon for being manually screwed into the ground to provide a secure anchor. A typical block 70 is preferably attached to the post member 67. The second end 63 of the cable 59 can then be fixedly attached relative to the anchor member 65 by being extended through the block 70 in the typical manner.

The assembly 11 includes a second hub member 71 (see, in general, FIG. 5) for being fixedly attached to the non-drive wheel 15. The second hub member 71 may be substantially identical to the first hub member 17, including a shaft 73 which may be integrally constructed with the rim of the non-drive wheel 15 or may be removably attached thereto by way of a flange 75 as hereabove described relative to the first hub member 17.

Figure 8:
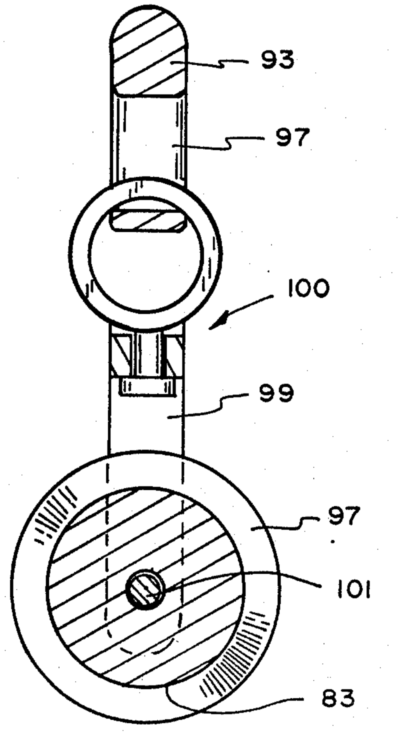
FIG. 8 is a sectional view substantially as taken on line VIII—VIII of FIG. 7.

The assembly 11 includes a guide means 77 (see, in general, FIG. 5) attached to the second hub member 71 for guiding the midportion of the cable 59 between the reel member 31 and the anchor member 65. The guide means 77 preferably includes a guide member 79 for guidingly receiving a portion of the cable 59 and a connecting member 81 for connecting the guide member 79 to the second hub member 71. The guide member 79 may consist of a standard pulley or sheave having a groove 83 for receiving the cable 59. The connecting member 81 preferably includes a sleeve 85 for fitting over the shaft 73 of the second hub member 71 and for being fixedly attached thereto in any manner apparent to those skilled in the art, such as by way of a pin member 87 extending through transverse apertures 89 in the sleeve 85 and transverse apertures 91 in the shaft 73 of the second hub member 71. An axle 93 is rotatingly mounted to the outer end of the sleeve 85. Thus, a typical roller bearing 95, or the like, is preferably provided between the axle 93 and the sleeve 85 to allow the axle 93 to freely rotate relative to the sleeve 85 and, therefore, the second hub member 71 and the non-drive wheel 15. The outer end of the axle 93 is preferably provided with an eye 97 to which a bracket 99 is typically mounted by way of a swivel means 100 or the like (see, e.g., FIGS. 8). The guide member 79 is, in turn, rotatingly mounted to the bracket 99 by way of a sheave axle 101.

The pin members 43, 57, 87 may consist of typical clevis pins for use with typical hitch pin clips or the like to prevent the accidental removal thereof as will now be apparent to those skilled in the art.

Figure 9:
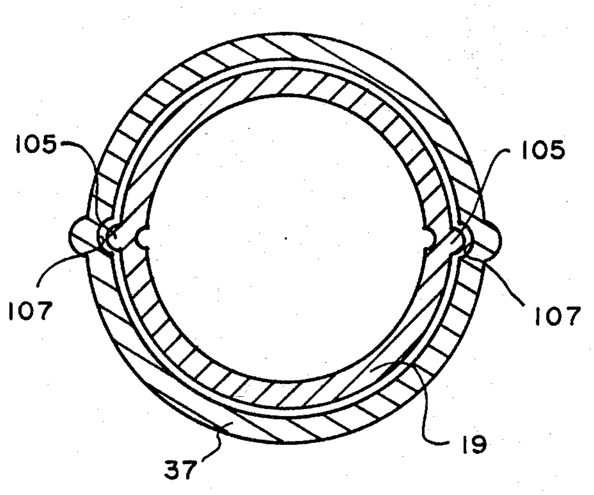
FIGS. 9 and 10 are sectional view substantially as taken on lines IX—IX of FIG. 4 and lines X—X of FIG. 7, respectively, with portions thereof removed for clarity.
Figure 10:
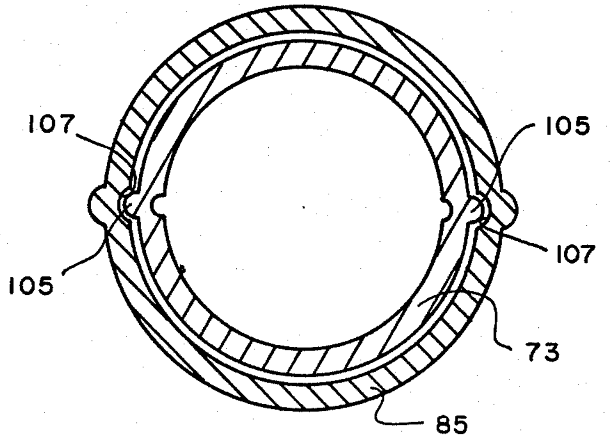

The shaft 19 and sleeve 37 of the first hub member 17 and reel member 31, and the shaft 73 and sleeve 85 of the second hub member 71 and guide member 79 preferably include guide means for use in mounting the sleeves 37, 85 on the respective shafts 19, 73 with the respective transverse apertures 29, 41 and 89, 91 aligned with one another. The guide means may consist simply of a crimp-like projection 105 formed on the exterior of each shaft 19, 73 and a coacting crimp-like depression 107 formed on the interior of each sleeve 37, 85 (see, in general, FIGS. 9 and 10).

The use of the assembly 11 is quite simple. The first and second hub members 17, 71 may be permanently attached to the drive wheel 13 and non-drive wheel 15 and the reel member 31, connecting member 35, cable 59, anchor member 65, guide means 77 and connecting member 81 may be conveniently stored in the trunk or other storage area of the wheeled vehicle for use when needed. If the wheeled vehicle becomes stuck in mud, snow or the like, the reel member 31 and connecting member 35 can easily be attached to the first hub member 17, and the guide means 77 and connecting member 81 can be easily attached to the second hub member 71. The first end 61 of the cable 59 is fixedly attached to the spool member 33 and the second end 63 thereof is extended over the guide member 79 and to a fixed anchor, such as a post, tree or the like. Alternately, the anchor member 65 may be fixedly attached to the ground and the second end 63 of the cable 59 may be fixedly attached relative to the anchor member 65. More specifically, the second end 63 of the cable 59 is preferably extended through the block 70 of the anchor member 65 and back to the wheeled vehicle for being attached to the bumper 103 or other frame structure thereof. The wheeled vehicle can then be started and rotation of the drive wheel 13 will cause the cable 59 to wind about the spool member 53 and will thereby pull the wheeled vehicle toward the anchor member 65. The guide means 77 will properly guide the cable 59 relative to the non-drive wheel 15 and prevent the cable 59 from coming in contact with the wheeled vehicle.

Although the present invention has been described and illustrated with respect to a preferred embodiment thereof and a preferred use therefore, it is not to be so limited since changes and modifications can be made therein which are within the full intended scope of the invention.

I claim:

1. A winch assembly for use with an anchor and a wheeled vehicle having at least one drive wheel and at least one other wheel, said assembly comprising:

(a) a first hub member fixedly attached to said drive wheel for rotation therewith; said first hub member including a shaft;

(b) a reel member fixedly attached to said first hub member for rotation therewith; said reel member including a spool member and including a connecting member fixedly connecting said spool member to said shaft of said first hub member;

(c) an elongated cable having a first end fixedly attached to said reel member, having a second end fixedly attached relative to said anchor and having a midportion between said first and second ends; said spool member of said reel member holding said cable;

(d) a second hub member fixedly attached to said other wheel; said second hub member including a shaft; and (e) guide means attached to said second hub member for guiding said midportion of said cable between said reel member and said anchor; said guide means including a sheave member for guiding said cable and including a connecting member connecting said sheave member to said shaft of said second hub member; said connecting member of said guide means including a sleeve for fitting over said shaft of said second hub member, including an axle rotatably attached to said sleeve, and including a bracket attached to said axle for receiving said sheave member.

2. The assembly of claim 1 in which is included a pin member fixedly attaching said sleeve of said connecting member of said guide means to said shaft of said second hub member.

3. The assembly of claim 1 in which is included a portable anchor member for being fixedly attached to the ground adjacent to said wheeled vehicle.

4. The assembly of claim 3 in which said anchor member includes a block for receiving said cable.

5. The assembly of claim 4 in which said anchor member includes a screw for being screwed into the ground adjacent said wheeled vehicle.

6. The assembly of claim 1 in which said connecting member of said reel member includes a sleeve for fitting over said shaft of said first hub member and includes an axle for receiving said spool member.

7. The assembly of claim 6 in which is included pin members fixedly attaching said sleeve of said connecting member of said reel member to said shaft of said first hub member and fixedly attaching said spool member to said axle of said connecting member of said reel member.

* * * * *